US008745722B2

(12) United States Patent
Niemi

(10) Patent No.: US 8,745,722 B2
(45) Date of Patent: Jun. 3, 2014

(54) MANAGING REMOTE NETWORK ADDRESSES IN COMMUNICATIONS

(75) Inventor: Teemu Niemi, Vaasa (FI)

(73) Assignee: Wapice Oy, Vaasa (FI)

(*) Notice: Subject to any disclaimer, the term of this patent is extended or adjusted under 35 U.S.C. 154(b) by 0 days.

(21) Appl. No.: 13/416,520

(22) Filed: Mar. 9, 2012

(65) Prior Publication Data

US 2013/0239198 A1    Sep. 12, 2013

(51) Int. Cl.
H04L 29/06 (2006.01)
G06F 21/00 (2013.01)
G06F 15/16 (2006.01)
H04L 12/28 (2006.01)
H04L 12/22 (2006.01)
H04L 29/12 (2006.01)

(52) U.S. Cl.
USPC ............. 726/12; 726/15; 726/25; 713/186; 709/218; 709/227; 709/228; 709/230; 370/401

(58) Field of Classification Search
USPC ......... 726/12, 15, 25; 713/201, 186; 709/218, 709/227, 228, 230; 370/401
See application file for complete search history.

(56) References Cited

U.S. PATENT DOCUMENTS

2002/0010866 A1* 1/2002 McCullough et al. ........ 709/228
2002/0186698 A1* 12/2002 Ceniza .......................... 370/401
2003/0079032 A1* 4/2003 Orsolits et al. ................ 709/230
2007/0198656 A1* 8/2007 Mazzaferri et al. ........... 709/218
2011/0131647 A1* 6/2011 Sanders et al. ................. 726/25

FOREIGN PATENT DOCUMENTS

EP       1434406 A2 *   6/2004

OTHER PUBLICATIONS

Shashank Shanbhag, Tilman Wolf; "Implementation of end-to-end abstractions in a network service architecture"; Dec. 2008; CoNEXT '08: Proceedings of the 2008 ACM CoNEXT Conference; Publisher: ACM; pp. 1-12.*

* cited by examiner

Primary Examiner — Andrew Nalven
Assistant Examiner — Courtney Fields
(74) Attorney, Agent, or Firm — Oliff PLC

(57) ABSTRACT

A method for managing routing information in a communications system comprises-defining, in a client network apparatus, a unique private IP address, the unique private IP address uniquely identifying a terminal and the corresponding remote network. The client apparatus defines an IP routing address for the remote network. The client apparatus routes a data packet to a VPN tunnel having the IP routing address defined for the remote network, the data packet being directed to the remote network identified by the unique private IP address. The unique private IP address is translated into a corresponding customer IP address of the terminal in order the data packet to be routable to the terminal in the remote network.

19 Claims, 13 Drawing Sheets

408 — Site Security Gateway Configuration

Site ID: 124167

Security Gateway Template: PPTP / Windows ▶

Security Gateway: IP address or DNS name ▶

Connect Parameters:

| Parameter | Value |
|---|---|
| GW_IP | 82.12.32.12 |
| USER_NAME | vpn |
| PASSWORD | **** |

409

Disconnect Parameters:

| Parameter | Value |
|---|---|

Query Status Parameters:

| Parameter | Value |
|---|---|
| PING_IP | 10.150.0.1 |

Fig. 4B

```
        GWStatus[]    connect(GWSpec[]     gws,    String
        sSiteUIIdentifier, int iSiteID);
        GWStatus[]    disconnect(GWSpec[]    gws,    String
        sSiteUIIdentifier, int iSiteID);
501     GWStatus[]  requestStatus(GWSpec[]   gws,   String
        sSiteUIIdentifier, int iSiteID);

public class GWSpec {
                public int m_Type;
502             public java.util.Map<String, String>
        Parameters;
        } public class GWStatus {
                public String ExecutionOutput;
503             public int ExecutionResult;
                public long ExecutionTimeMs;
        }
```

Fig. 5

MANAGING REMOTE NETWORK ADDRESSES IN COMMUNICATIONS

FIELD OF THE INVENTION

The exemplary and non-limiting embodiments of this invention relate generally to communications networks, and more particularly to managing data routing information.

BACKGROUND ART

A virtual private network (VPN) refers to a communication network which uses public network resources to provide private network capabilities without necessarily using dedicated network resources. Subscriber lines connected to different network exchanges, constitute a virtual private network that may include private network capabilities, such as contact restrictions, private addressing plan, tunnelling, and/or encryption.

A VPN gateway (virtual private network gateway) refers to an integrated firewall and/or a virtual private network (VPN) hardware device that includes static routing functions and provides secure end-to-end VPN connections between sites. The VPN gateway may be used for the secure connection of a company's central site and branch offices as well as for connecting a company with its partners, customers, or subcontractors. The VPN gateway implements an IP security standard, secured internet protocol (IPSec), and internet key exchange (IKE) key management. It also supports network address translation (NAT).

One of the problems associated with the above arrangement is that in situations where two or more different VPN technologies are used and have conflicting IP addresses, an overlapping customer network prevents more than one VPN to be active at the same time because of the overlapping IP addresses. Thus, only a single VPN tunnel can be up at the same time. The situation of conflicting IP addresses may be managed by defining the remote networks such that they are not overlapping. However, construction and management of such a system is complicated.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise a method, apparatuses, a computer program, and an article of manufacture as defined in the independent claims. Further embodiments of the invention are disclosed in the dependent claims.

An aspect of the invention relates to a method for managing data routing information in a communications system, the method comprising defining, in a client network apparatus, a unique private IP address for a terminal located in a remote customer network, the unique private IP address uniquely identifying the terminal and the corresponding remote customer network; defining, in the client network apparatus, an IP routing address for the remote customer network; routing a data packet from the client network apparatus to a virtual private network tunnel having the IP routing address defined for the remote customer network, the data packet being directed to the remote customer network, the remote customer network being identified by the unique private IP address, wherein the unique private IP address of the terminal is translated into a corresponding customer IP address of the terminal in order the data packet to be routable to the terminal in the remote customer network.

A further aspect of the invention relates to an apparatus comprising a communication control circuitry configured to define a unique private IP address for a terminal located in a remote customer network, the unique private IP address uniquely identifying the terminal and the corresponding remote customer network; define an IP routing address for the remote customer network; route a data packet from the apparatus to a virtual private network tunnel having the IP routing address defined for the remote customer network, the data packet being directed to the remote customer network, the remote customer network being identified by the unique private IP address, wherein the unique private IP address of the terminal is translated into a corresponding customer IP address of the terminal in order the data packet to be routable to the terminal in the remote customer network.

A still further aspect of the invention relates to an apparatus comprising at least one processor; and at least one memory including a computer program code, wherein the at least one memory and the computer program code are configured to, with the at least one processor, cause the apparatus to define a unique private IP address for a terminal located in a remote customer network, the unique private IP address uniquely identifying the terminal and the corresponding remote customer network; define an IP routing address for the remote customer network; route a data packet from the apparatus to a virtual private network tunnel having the IP routing address defined for the remote customer network, the data packet being directed to the remote customer network, the remote customer network being identified by the unique private IP address, wherein the unique private IP address of the terminal is translated into a corresponding customer IP address of the terminal in order the data packet to be routable to the terminal in the remote customer network.

A still further aspect of the invention relates to a gateway node comprising a communication control circuitry configured to route a data packet from a client network apparatus to a virtual private network tunnel, the virtual private network tunnel based on an IP routing address defined for a remote customer network, the data packet being directed to the remote customer network, the remote customer network being identified by a unique private IP address, the unique private IP address uniquely identifying a terminal and the corresponding remote customer network, and translate the unique private IP address of the terminal into a corresponding customer IP address of the terminal in order the data packet to be routable to the terminal in the remote customer network.

A still further aspect of the invention relates to a computer program comprising program code means adapted to perform any one of the following steps when the program is run on a computer: defining, in a client network apparatus, a unique private IP address for a terminal located in a remote customer network, the unique private IP address uniquely identifying the terminal and the corresponding remote customer network; defining, in the client network apparatus, an IP routing address for the remote customer network; routing a data packet from the client network apparatus to a virtual private network tunnel having the IP routing address defined for the remote customer network, the data packet being directed to the remote customer network, the remote customer network being identified by the unique private IP address, wherein the unique private IP address of the terminal is translated into a corresponding customer IP address of the terminal in order the data packet to be routable to the terminal in the remote customer network.

A still further aspect of the invention relates to an article of manufacture comprising a computer readable medium and embodying program instructions thereon executable by a computer operably coupled to a memory which, when executed by the computer, carry out the functions of defining, in a client network apparatus, a unique private IP address for a terminal located in a remote customer network, the unique private IP address uniquely identifying the terminal and the corresponding remote customer network; defining, in the client network apparatus, an IP routing address for the remote customer network; routing a data packet from the client network apparatus to a virtual private network tunnel having the IP routing address defined for the remote customer network, the data packet being directed to the remote customer network, the remote customer network being identified by the unique private IP address, wherein the unique private IP address of the terminal is translated into a corresponding customer IP address of the terminal in order the data packet to be routable to the terminal in the remote customer network.

BRIEF DESCRIPTION OF THE DRAWINGS

In the following the invention will be described in greater detail by means of preferred embodiments with reference to the attached drawings, in which

FIG. 5 illustrates a security gateway web service description according to an exemplary embodiment;

DETAILED DESCRIPTION OF SOME EMBODIMENTS

Figure 1:
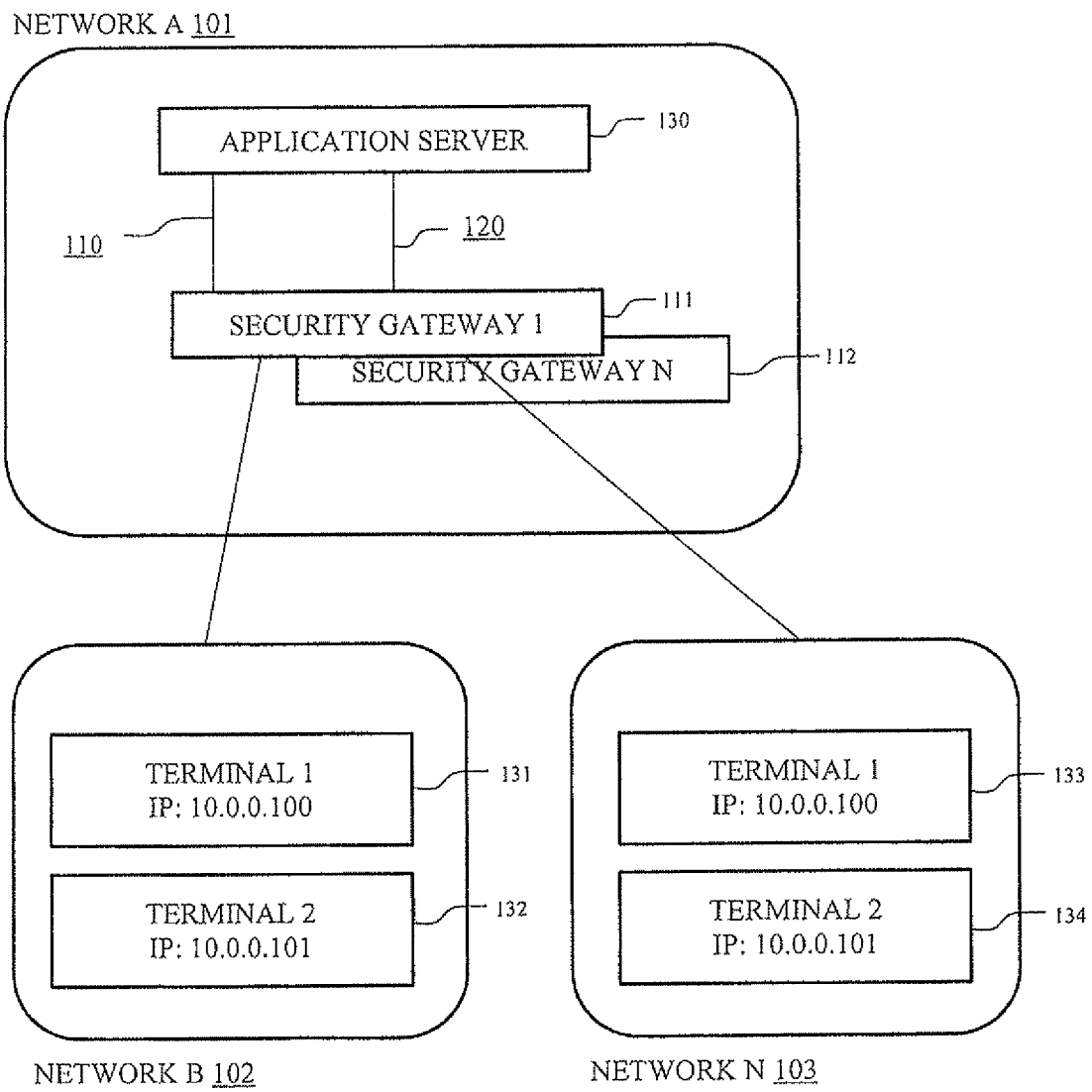
FIG. 1 shows a simplified block diagram illustrating exemplary system architecture.

An exemplary embodiment relates to managing multi-vendor VPN (virtual private network) environments. An application server may connect to multiple VPN sites which have overlapping remote networks with multi-vendor VPN implementations. The application server may connect, disconnect and query the status of VPN tunnels. The application server connects, by using a security gateway (such as a VPN gateway), to a remote terminal located in a remote network. To support overlapping remote networks the application server maintains a unique IP (internet protocol) address for each terminal. The application server maintains information for connecting, disconnecting and querying the status of the VPN tunnels.

A site herein may refer to a location where network elements or other communication equipment have been installed. Several network elements may be located at a site.

An exemplary embodiment relates in general to application servers which manage secure remote networks and connect to a specific remote terminal in a secure remote network. More particularly, an exemplary embodiment relates to a method where the application server does not require functionality changes when new VPN technologies are taken into use. Therefore an exemplary embodiment is not restricted to any specific VPN vendor or VPN technology.

A virtual private network (VPN) is a secure private network. There are multiple VPN technologies available, for example, IPSec (secured internet protocol) and SSL (secure sockets layer) based VPN. An exemplary embodiment is not restricted to any specific VPN technology because an exemplary embodiment enables managing multiple VPN technologies.

In an exemplary embodiment, the application server has an asset model including the remote terminals which the application server needs to connect. Each remote terminal has a system-wide unique private IP address. The private IP address is used to manage a situation where remote networks have overlapping IP addresses. The application server uses the terminal's private IP address for communication.

The application server asset model comprises a list of security gateways, and each terminal is configured to refer to a security gateway which handles its communication. For each VPN method, there are connect, disconnect and query status templates. These templates are parameterised templates and comprise information needed to connect, disconnect or query the status of the remote network connection. Multiple security gateways may be needed, for example, for load balancing and/or for supporting a situation where a VPN implementation cannot be hosted by a single server or device.

Exemplary embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any user terminal, network element, server, corresponding component, and/or to any communication system or any combination of different communication systems that support VPN tunnelling. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be applied, without restricting the embodiment to such an architecture, however.

With reference to FIG. 1, let us examine an example of a radio system to which embodiments of the invention can be applied. In this example, the radio system is based on LAN network elements. However, the invention described in these examples is not limited to the LAN systems but can also be implemented in other systems, such as WLAN, UMTS (universal mobile telecommunications system), LTE, GSM, EDGE, WCDMA, bluetooth network, or other fixed, mobile or wireless network. In an embodiment, the presented solution may be applied between elements belonging to different but compatible systems such as LAN and WLAN.

A general architecture of a communication system is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements, and protocols used in or for fixed or wireless communication are irrelevant to the actual invention. Therefore, they need not be discussed in more detail here.

FIG. 1 shows a simplified block diagram illustrating an application server, security gateways and secure remote networks and terminals according to an exemplary embodiment. Referring to FIG. 1, a network A 101 is a central server network which has a secure remote connection to a network B 102 and to multiple networks N 103. The remote networks 102 and 103 may have an overlapping network configuration and different VPN technologies. An application server 130 manages, via a connection 110, security gateways 111, 112 to open, close or query a remote connection status to remote networks. Multiple security gateways 112 may be utilized for scalability and for a possibility to support hardware-based VPN gateways or in case the VPN technology is not compatible with another VPN technology (e.g. a Windows or Linux based VPN). The security gateways 111, 112 typically comprise Windows or Linux operating systems implementing VPN connections and a web service interface for (FIG. 5.) managing remote VPN connections. The application server 130 communicates, via a connection 120, with remote terminals 131, 132, 133, 134. The remote terminals may have overlapping IP addresses 131, 133. In an exemplary embodiment, communication to overlapping IP address terminals 131, 133 uses a unique private IP address for each terminal and destination network address translation (DNAT) and destination IP address based routing in the security gateways 111, 112.

Figure 2:
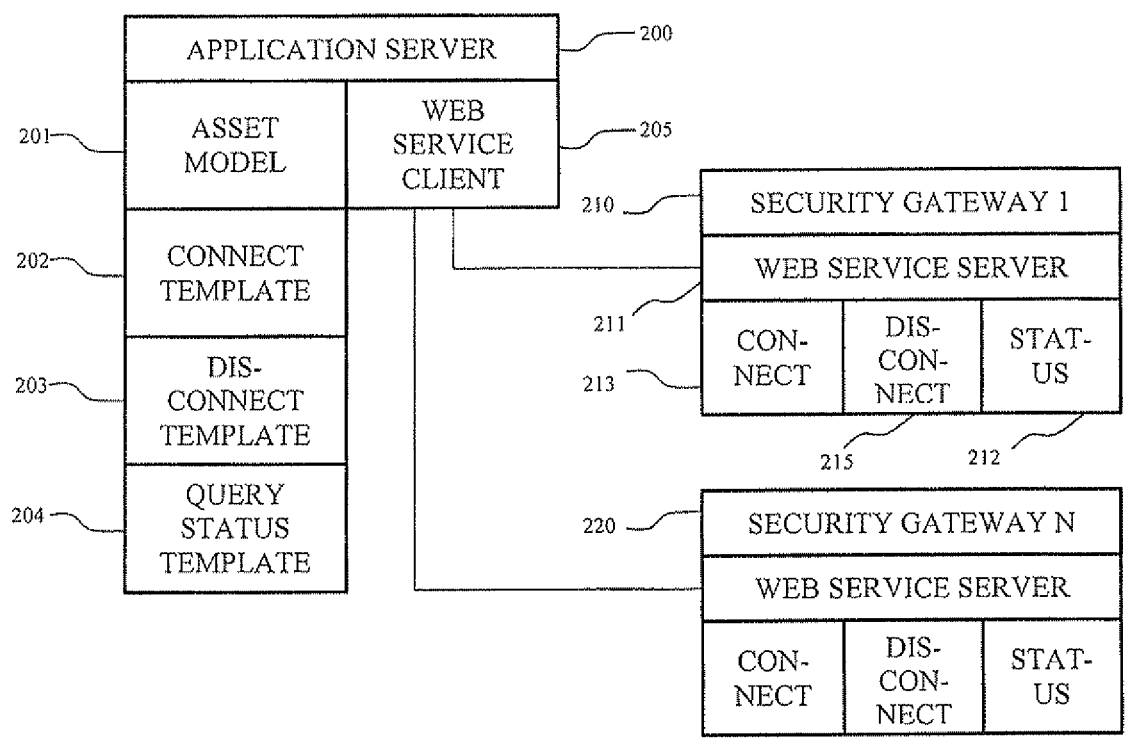
FIG. 2 shows a simplified block diagram illustrating exemplary apparatuses.

FIG. 2 shows a simplified block diagram illustrating logical components of the application server and the security gateway according to an exemplary embodiment. Referring to FIG. 2, the application server 200 has a data base including an asset model 201. The asset model 201 comprises information on terminals and their unique private IP addresses, a security gateway for use per remote network, and also templates 202, 203, 204 for managing a security gateway per VPN technology. A web service client 205 connects to a security web service 211 of the security gateways. The security gateway web service 211 interface comprises a connect function 213 for creating remote network connections, a disconnect function 215 for disconnecting a remote network connection, and a status function 212 for querying the status of the specific remote connection. The parameters of the web service 211 functions 213, 215, 212 are provided by means of connect 202, disconnect 203 and query status 204 templates. Additional security gateways 220 may be added if required for load balancing or by security policies or because of a conflicting VPN technology.

Figure 3:
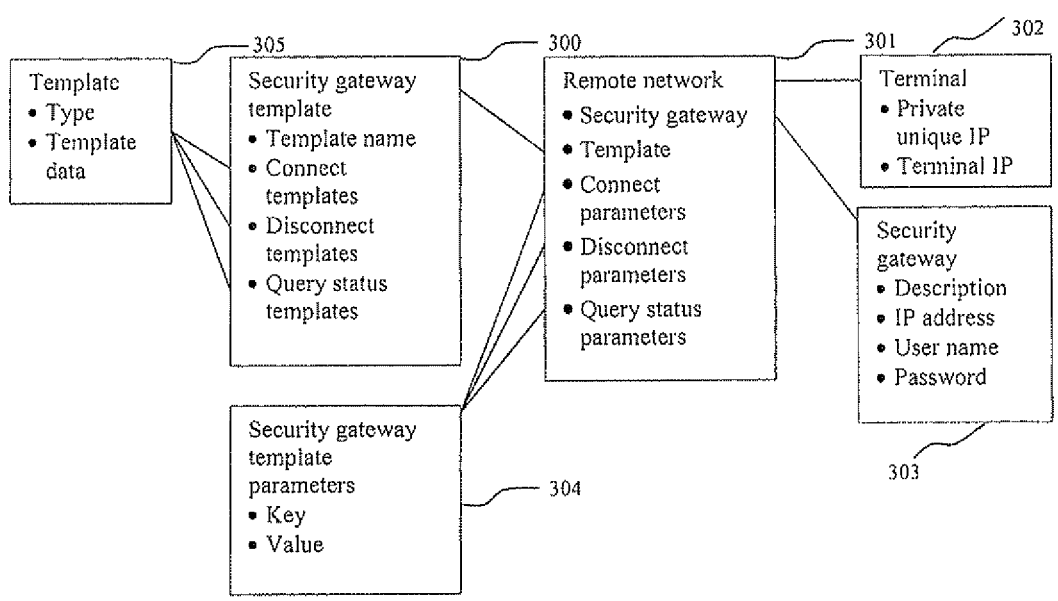
FIG. 3 illustrates an application server asset model according to an exemplary embodiment.

FIG. 3 illustrates an application server asset model related to a security gateway and remote terminals. Referring to FIG. 3, an application server database structure comprises an asset model of remote terminals 302. Each terminal 302 belongs to a remote network 301 which defines which security gateway 303 is used for communicating with the specific terminal 302. The remote network 301 refers to a security gateway template 300 comprising templates for connecting, disconnecting and/or querying the status of a remote connection. A template name refers to a VPN technology used to connect to the remote network 301 and connect, disconnect and query status templates may include an unlimited amount of templates. The remote network 301 also refers to security gateway template parameters 304 which include parameters passed to the security gateway templates 300 before the web service of the security gateway 303 is invoked.

Figure 4:
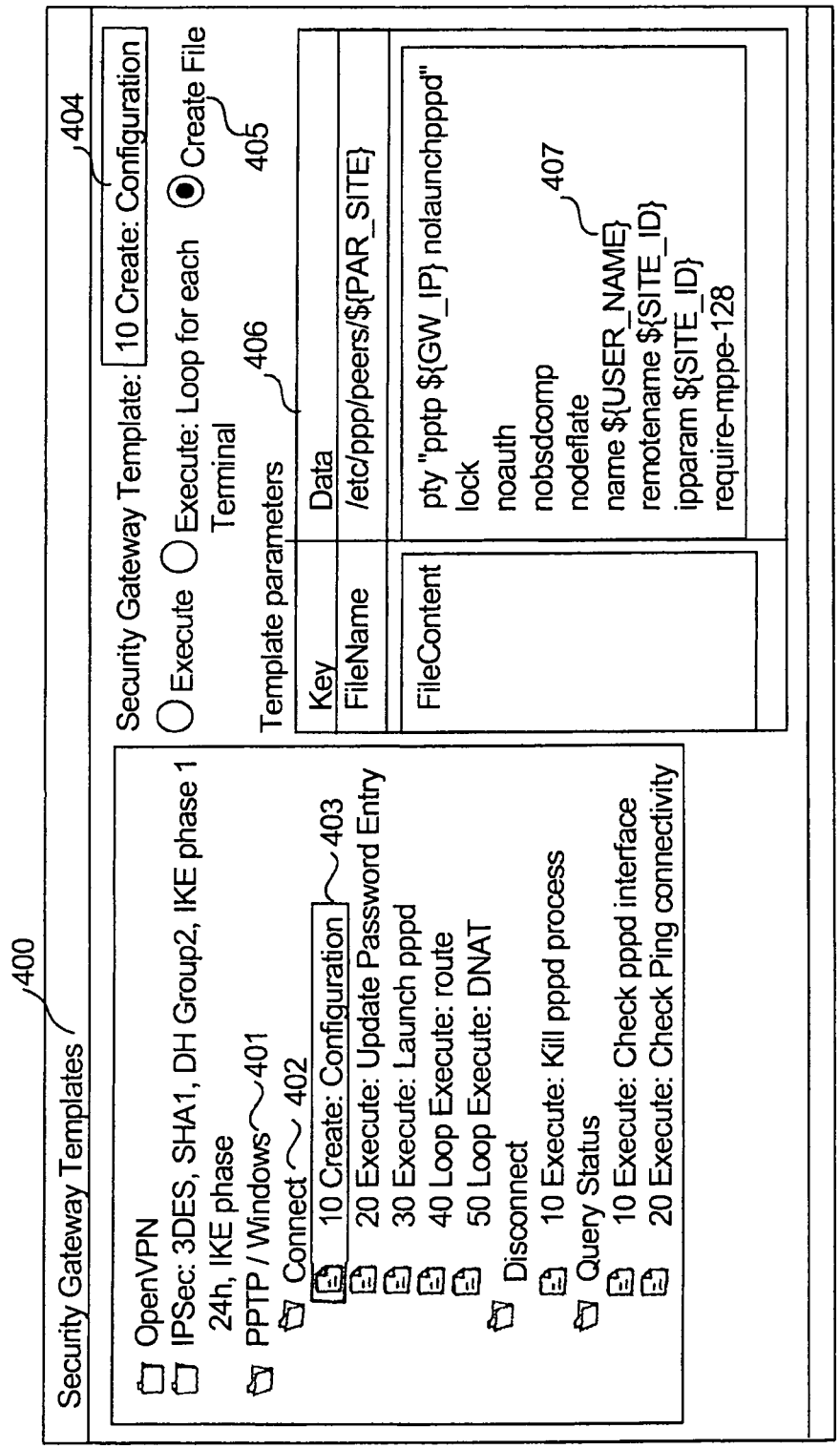
FIGS. 4A and 4B illustrate a security template according to an exemplary embodiment.

FIG. 4 illustrates a security template according to an exemplary embodiment. Referring to FIG. 3 and FIG. 4, an application server user interface provides a view for configuring security gateway templates 400 and a view for configuring security gateway template parameters 408. The templates 401 are stored in the database in the security gateway template table 300. Each security gateway template includes a connect 402, disconnect and query status template. Zero to multiple templates per connect, disconnect and query status may exist. A concrete single template 305, 403, 404 involves a template type 305, 405 and template data 305, 406. The template type 405 may be "Execute", "Execute: Loop for each terminal", or "Create file". "Execute" 405 and "Execute: Loop for each terminal" 405 take a command to be executed as parameters. Execute type runs the command defined in command parameters. In the same way "Execute: Loop for each terminal" executes the command, but the command parameter is cloned for each terminal using the template, thus allowing executing terminal specific commands. Create file 405 command takes FileName and FileContent as a parameter. Templates may include parameters which are replaced with concrete values of the remote network 301, 409 configuration, and allowing a creation of general purpose templates.

FIG. 5 illustrates a security template according to an exemplary embodiment. Referring to FIG. 4 and FIG. 5, connect, disconnect and request status 501 web service functions are identical functions, also implementation of the functions may be identical, but the functions are named by the use case for logging purposes. Web service functions 501 takes an array of GWSpec 502 as a parameter and returns an array of GWStatus 503. The arrays of GWSpec and GWStatus are of the same size, and the indices of the elements in the tables correspond to each other (for example, a result of a GWSpec[0] command is stored in GWStatus[0]). The type of the GWSpec 502 defines Create file or Execute 405 in the type attribute and template parameters 407 in the parameters attribute. Each connect, disconnect and query status function call includes each template of the specific security gateway template in the GWSpec array. The return value 503 is a result array of each execution or file creation in a template. The GWStatus 503 includes an execution output and execution result code which are implementation specific, and an execution time of the command.

Figure 6:
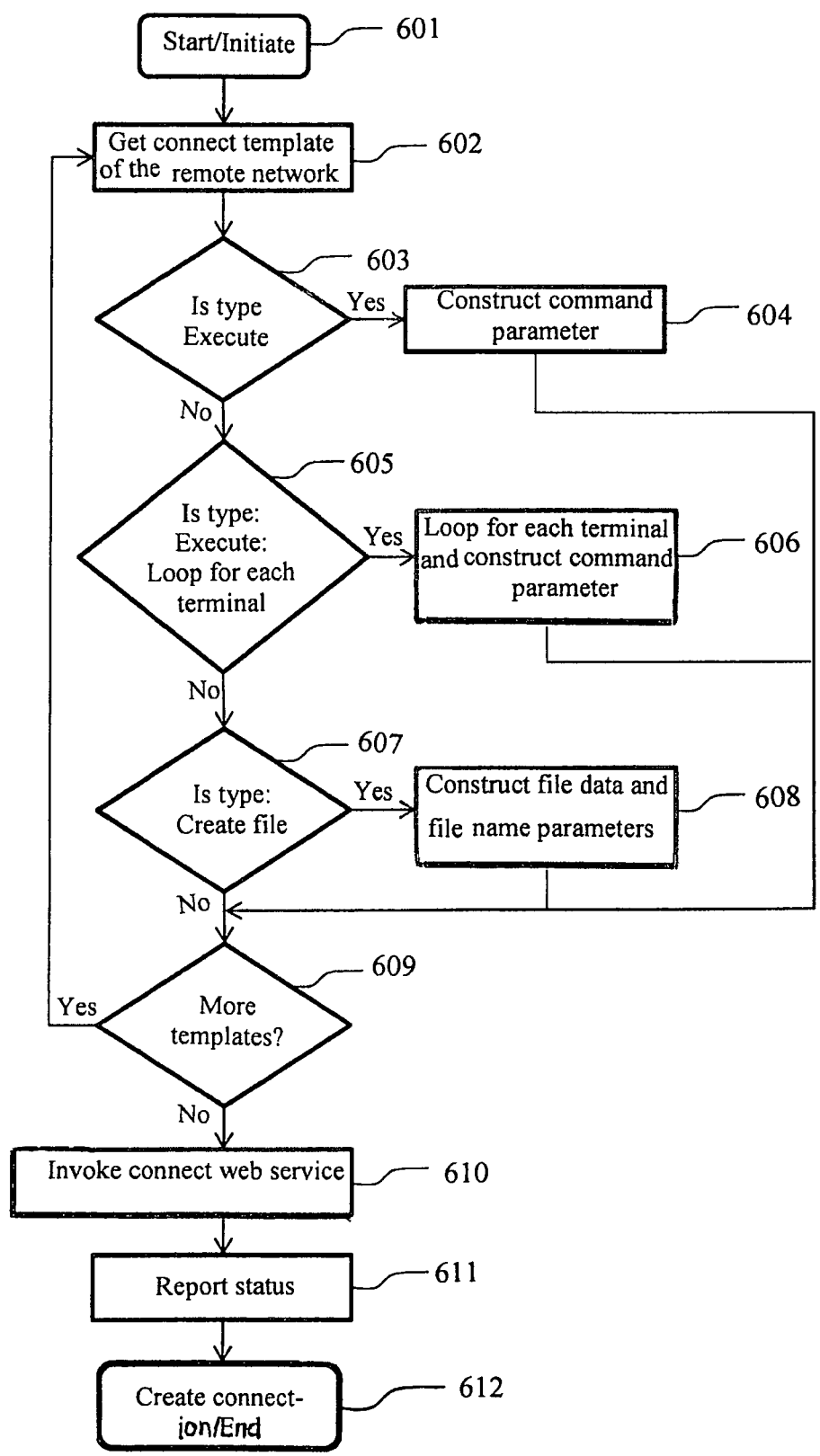
FIG. 6 shows a schematic diagram of a flow chart illustrating remote connection creation according to an exemplary embodiment.

FIG. 6 shows a schematic diagram of a flow chart according to an exemplary embodiment. Referring to FIG. 6, the flow chart presents remote network connection creation. Flow charts for disconnecting and querying status are identical, except for using a different template and a different web service. At the beginning, an application server user may initiate 601 (e.g. by an input entered via a keyboard, mouse, screen, push button etc.) remote connection creation. The application server then reads 602 the first connect template of the specific remote network. If, in item 603, it is found out that the type of the template is Execute, a construct command parameter is created 604. The constructed command comprises a template (407 in FIG. 4) with replaced parameters (409 in FIG. 4). In this case the template may have only one type, therefore the process proceeds to item 609. However, if, in item 603, it is found out that the template type is not Execute, the process proceeds to item 605. If, in item 605, it is found out that the template type is "Execute: loop for each terminal", the parameter construction duplicates the template data for each terminal and replaces the parameters from the terminal asset in item 606. A use case for "Execute: loop for each terminal" is DNAT (destination network address translation) and destination IP address based routing in security gateways (131, 133, 111, 112 in FIG. 1). If, in item 607, it is found out that the template type is Create file 607, the Create file template type constructs a file name and a file data parameter in item 608. In item 609, it is checked whether or not there are more templates required for the remote connection creation; if more templates exist, these are handled each. After the template parameters have been constructed, the web service is invoked in item 610. The web service (213 in FIG. 2) loops the execute and create file parameters (502 in FIG. 5) and returns the statuses (503 in FIG. 5). The returned values are presented to the user in item 611, and finally the remote connection is created if succeeded in item 612.

Figure 7:
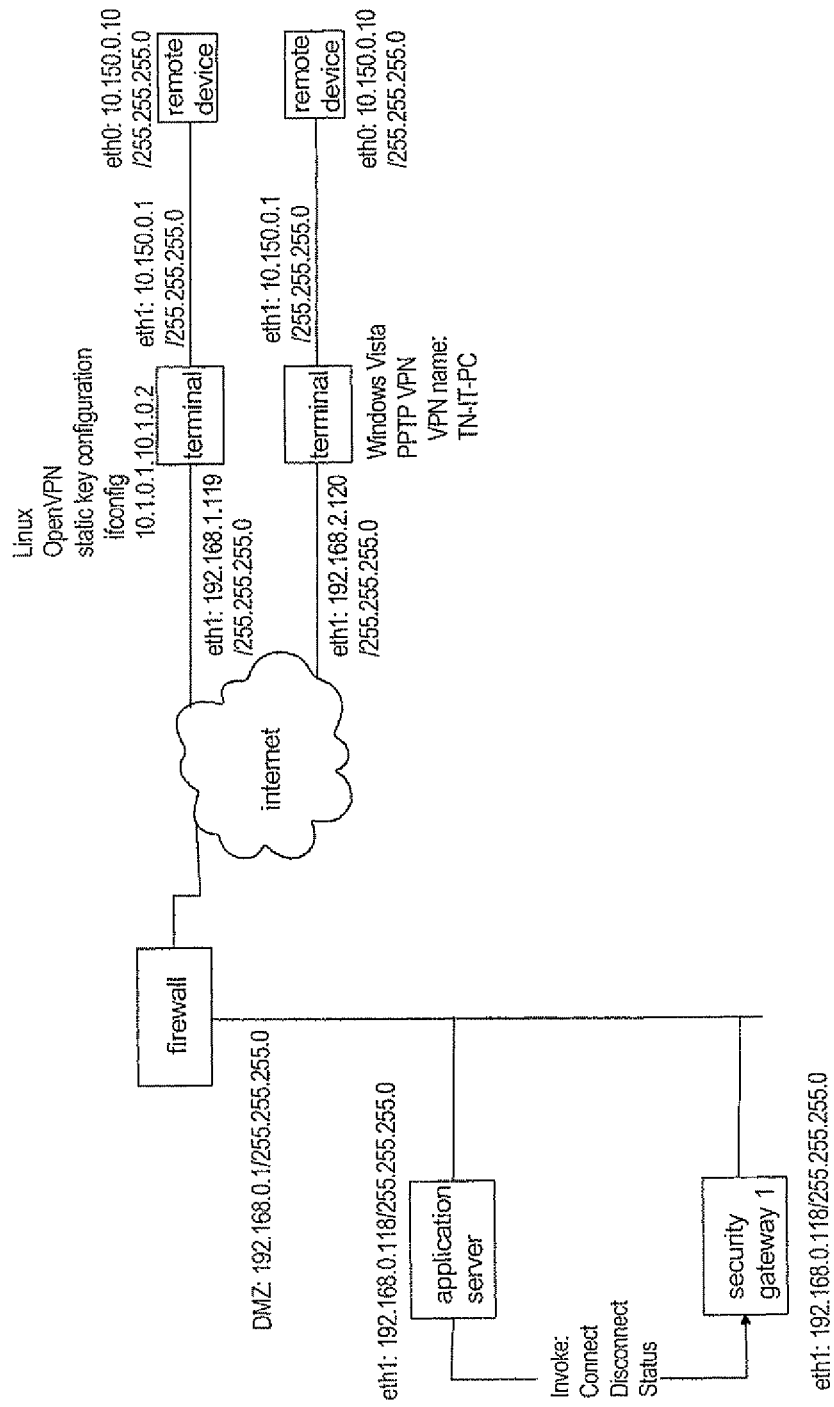
FIG. 7 shows a simplified block diagram illustrating a prior art system architecture.
Figure 8:
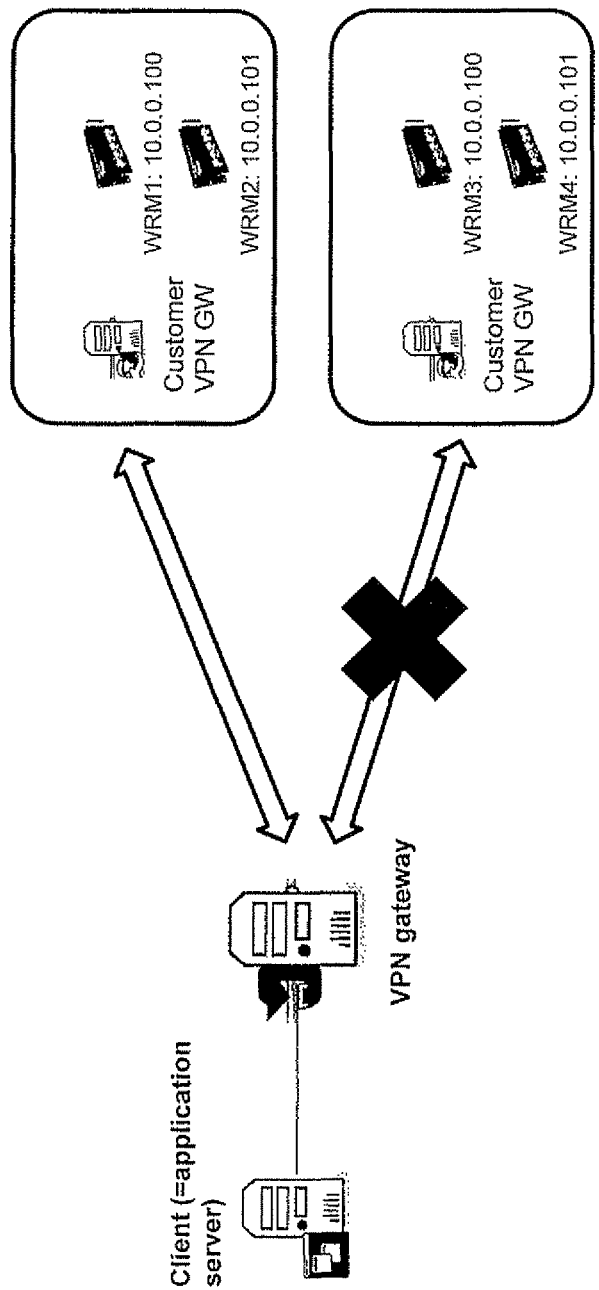
FIG. 8 shows a simplified block diagram illustrating a prior art system architecture.

FIG. 7 shows a simplified block diagram illustrating situations where two different VPN technologies are used and have conflicting IP addresses. FIG. 8 shows a situation where an overlapping customer network prevents more than one VPN to be active at the same time because of the overlapping IP addresses. Thus, in FIG. 7 and FIG. 8, a single VPN tunnel is up (only one (conflicting) tunnel active at a time).

Figure 9:
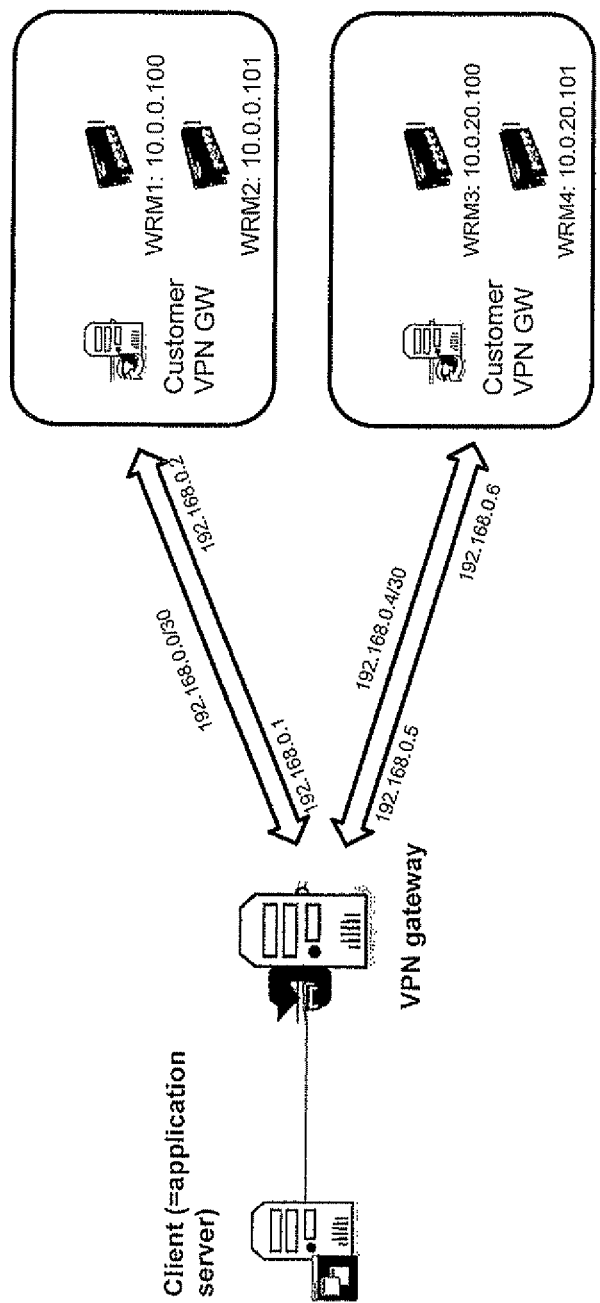
FIG. 9 shows a simplified block diagram illustrating a prior art system architecture.

Conventionally the situation of conflicting IP addresses is handled by standardizing the remote networks such that they are not overlapping. FIG. 9 shows a situation where a unique IP address per device (at customer end or at VPN gateway) and a unique VPN network per customer are needed (conflicting IP addresses of the customer terminals have been handled by standardizing the remote customer networks to be non-overlapping (e.g. IP addresses 10.0.0.100 and/or 10.0.0.101 do not overlap with IP addresses 10.0.20.100 and/or 10.0.20.101)). Thus, in FIG. 9, multiple VPN tunnels may be up at the same time.

Figure 10:
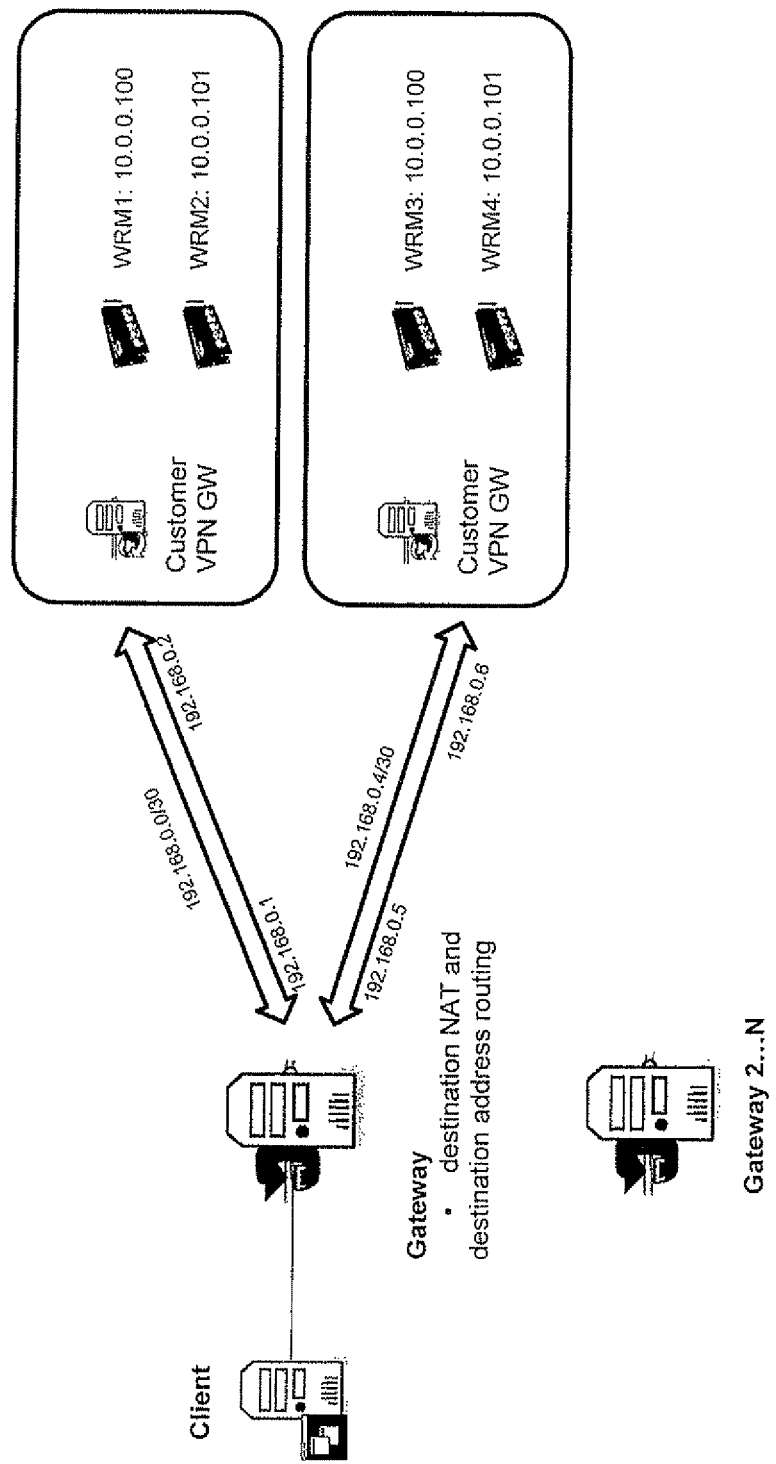
FIG. 10 shows a simplified block diagram illustrating an exemplarysystem architecture.
Figure 11:
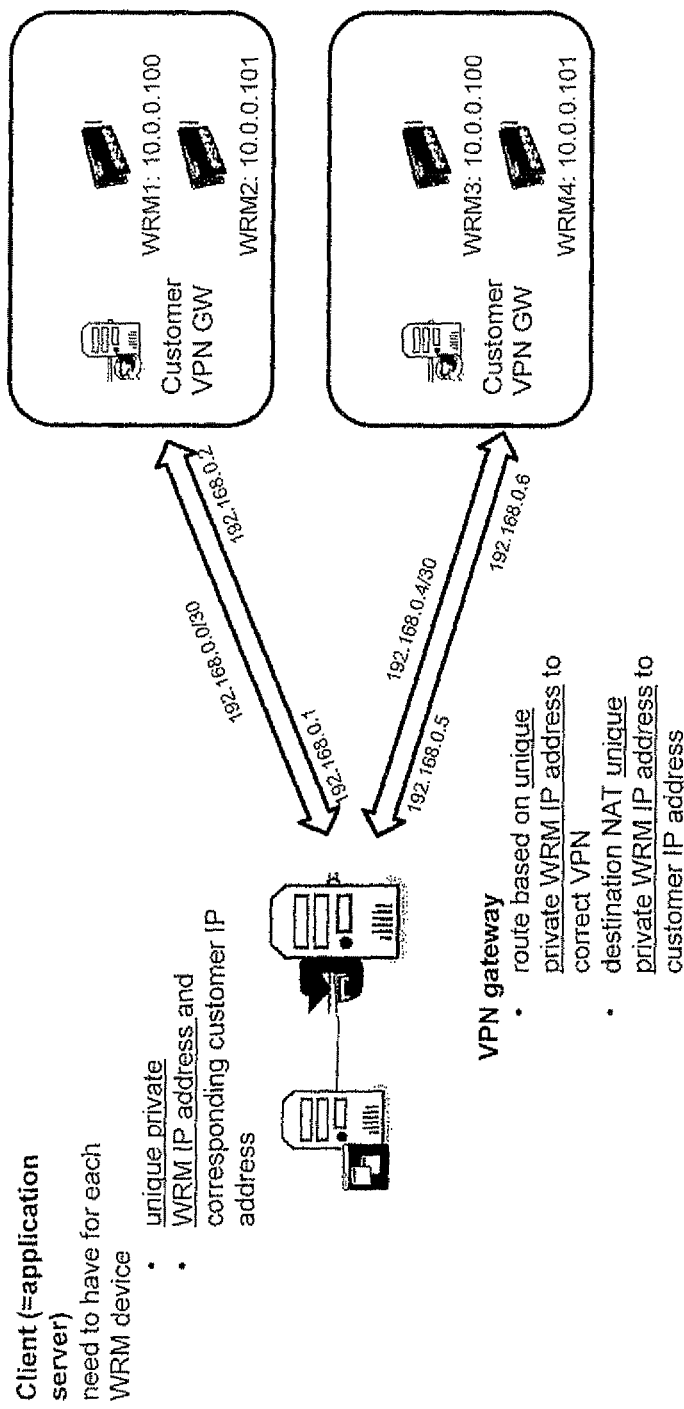
FIG. 11 shows a simplified block diagram illustrating an exemplary system architecture.

FIG. 10 and FIG. 11 show a simplified block diagram illustrating an exemplary system architecture. In FIG. 10, a situation is shown where the security gateway applies destination NAT and destination address routing. In FIG. 11, a situation is shown where the application server (=client) is configured to define a unique private IP address and a corresponding customer IP address for each device as follows:

Customer1
Route: 192.168.0.1
WRM1: 172.16.0.1->10.0.0.100
WRM2: 172.16.0.2->10.0.0.101
Customer2
Route: 192.168.0.5
WRM3: 172.16.1.1->10.0.0.100
WRM4: 172.16.1.2->10.0.0.101

The VPN gateway is configured to route data to the correct VPN based on the unique private IP address, A destination NAT unique private IP address to customer IP address may be applied as follows:

Customer1
Route: 172.16.0.* to 192.168.0.1
DNAT: 172.16.0.1->10.0.0.100
DNAT: 172.16.0.2->10.0.0.101
Customer2
Route: 172.16.1.* to 192.168.0.5
DNAT: 172.16.1.1->10.0.0.100
DNAT: 172.16.1.2->10.0.0.101

If the remote customer networks cannot be arranged such that they are non-overlapping, internal IP addresses may be defined for client's communication and in the VPN gateway, wherein a packet is routed to the correct "VPN tunnel" and after the routing, the destination IP address is changed to be the IP address of the internal network of the customer, in order to be able to communicate in the customer's network. Multiple VPN implementations and conflicting customer IPs may thus become allowable (e.g. IP addresses 10.0.0.100, 10.0.0.101 of "customer 1" may overlap with IP addresses 10.0,0.100, 10.0.0.101 of "customer 2" as the unique private IP addresses 172.16.0.1, 172.16.0.2 do not overlap with the unique private IP addresses 172.16.1.1, 172.16.1.2)).

A security gateway refers to a service which enables an application server to open VPN connections on various VPN environments. The security gateway may basically comprise any device implementing web services. In practise, the security gateway may be implemented by using e.g. SUSE Linux enterprise server 11. The web services in the security gateway may be implemented, for example, by using Java EE.

The architecture allows multiple security gateways and also supports conflicting IP addresses in site installations which are handled by defining a unique private IP address for each terminal. The web services on the security gateway mainly invoke commands and scripts given by the application servers. Therefore when new VPN connections or VPN implementations are added the changes may be done from application server management views. The security gateway may be tested in an environment which is consisting from Windows PPTP and OpenVPN VPN implementations. The test case is the first test case used to develop web services to a security gateway. Another test case is intended to be used for testing the situation where the customer VPN has multiple identical confliction configurations (Windows PPTP).

Table 1 illustrates an exemplary OpenVPN template.

TABLE 1

| | FileName [Create File] | FileData [Create File] or Command [Execute] |
|---|---|---|
| Connect | | |
| Create File | /etc/openvpn/${SITE}.conf | dev tun |
| | | remote ${REMOTE_IP} |
| | | # 10.1.0.2 is our local VPN endpoint (home). |
| | | # 10.1.0.1 is our remote VPN endpoint (office). |

TABLE 1-continued

| | FileName [Create File] | FileData [Create File] or Command [Execute] |
|---|---|---|
| Create File | /etc/openvpn/${SITE}.key | ifconfig ${HOME_IP} ${REMOTE_IP} secret ${SITE}.key ${SITE_OPEN_VPN_STATIC_KEY} |
| Execute | | openvpn --cd /etc/openvpn --writepid /var/run/openvpn/${SITE}.pid --daemon SITE --config ${SITE}.conf |
| Execute | | iptables -t nat -A PREROUTING -i eth0 -d ${WRM_TERMINAL_WRM_UNIQUE_IP} -j DNAT -- to ${WRM_TERMINAL_SITE_IP} iptables -t mangle -A PREROUTING -i eth0 -d ${WRM_TERMINAL_WRM_UNIQUE_IP} -j MARK -- set-mark ${FW_MARK} ip rule add fwmark ${FW_MARK} table ${FW_MARK} ip route add ${WRM_TERMINAL_SITE_IP} dev ${IFACE} table ${FW_MARK} |
| Disconnect | | |
| Execute | | kill -TERM `cat/var/run/openvpn/${SITE}.pid` |
| Request Status | | |
| Execute | | if ps -p `cat /var/run/openvpn/${SITE}.pid`|grep openvpn > /dev/null; then exit 0;else exit 1;fl; |
| Execute | | ping -c 3 ${CONNECTIVITY_TEST_IP} |

Table 2 illustrates an exemplary PPTP template.

TABLE 2

| | FileName [Create File] | FileData [Create File] or Command [Execute] |
|---|---|---|
| Connect | | |
| Create File | /etc/ppp/peers/${SITE} | pty "pptp ${REMOTE_IP} --nolaunchpppd" lock noauth nobsdcomp nodeflate name ${USERNAME} remotename ${SITE} ipparam ${SITE} require-mppe-128 |
| Execute | /etc/ppp/chap-secrets | sed 's/${USERNAME} ${SITE} \".*/vpn SITE \"${PASSWORD}\"\ */g' -i /etc/ppp/chap-secrets |
| Execute | | pppd call ${SITE} updetach linkname ${SITE} |
| Execute | | iptables -t nat -A PREROUTING -i eth0 -d ${WRM_TERMINAL_WRM_UNIQUE_IP} -j DNAT --to ${WRM_TERMINAL_SITE_IP} iptables -t mangle -A PREROUTING -i eth0 -d ${WRM_TERMINAL_WRM_UNIQUE_IP} -j MARK -- set-mark ${FW_MARK} ip rule add fwmark ${FW_MARK} table ${FW_MARK} ip route add ${WRM_TERMINAL_SITE_IP} dev ${IFACE} table ${FW_MARK} |
| Disconnect | | |
| Execute | | kill -TERM `cat /var/run/ppp-${SITE}.pid | head -1` |
| Request Status | | |
| Execute | | ifconfig `cat/var/run/ppp-${SITE}.pld | tail-1` |

Regarding interface definitions, because the security gateway is to support conflicting IP addresses (same IP address is used in multiple sites), each terminal has a unique private IP address and a corresponding IP address at site (i.e. customer) side. This unique private IP address is used only on the server side (including the application server and the security gateway). The unique private IP addresses may be defined automatically when the terminal is installed to the site. The IP address is generated so that routing may be done as a network. This means that there may be some kind of a standard way to define IP addresses for the sites; for example:

Site1: 172.16.0.1-172.16.0.254
Site2: 172.16.2.1-172.16.2.254
SiteN: 172.16.N.1-172.16.N.254

The address space reserved for the site may be configurable in order the address space used not to conflict with customer sites. When the security gateway is used for the site, the unique private IP address and site IP address are needed. The application server uses the unique IP address for communication. It should also be noted that when the security gateway is not used for the site, the communication may use a configured IP address; therefore IP settings (customer IP address and internal service provider IP address) may only be valid for the sites using the security gateway. Basically this means that the system may support defining only one IP address for the terminal in case the security gateway concept is not used.

The security gateway template configuration (site connect/disconnect/query status refers to templates) is carried out by using a management view. A template may be used to create a common configuration. When the site is accessing the template, the site applies parameters to the data if specified. When a new version is created of the template which is in use in some site, the user is prompted and sites using the template are listed. The user tests and validates each template if new parameters are added. Defining VPN scripts is an administrative/developer task, therefore the view may be available only for administrators. In site asset configuration a security gateway site configuration is needed. The data may be shown only for a limited amount of people because it may contain sensitive data. There may be a page (i.e. a display view) maintained for displaying a connection status and providing a way to open and disconnect the connection. The application server may communicate with a web service.

Other VPNs which are possible to be implemented by using Linux, may be applied in any security gateway. The security gateway may also be implemented with Windows. In case of a hardware-based security connection, multiple ways to manage the situation are available:

1. In a management interface do not specify a security gateway,
2. In a management interface define a security gateway and give tasks to the security gateway to communicate with third party hardware if it provides external communication,
3. As a HW manufacture implementing the security gateway web service.

In a case where VPN is to be up continuously and where the security gateway(s) is/are rebooted, the application server may be configured to automatically open the VPN connection; i.e. VPN is to be started automatically. Alternatively, this may be implemented by using regular operating system initiation scripts. Thus, the application server may include a logic for setting up a VPN tunnel, or the security gateway start-up scripts may include a VPN connection setup function.

If VPN is using two factor authentication and it requires user interaction (e.g. SecurID token), there may be a functionality to pass a user password and the SecurID token. This may be implemented e.g. by using a prompt ${WRM_USER_ PROMPT_PAR_VALUE} which prompts the value from the user when creating the connection.

An exemplary embodiment enables multiplying (duplicating, copying) of the IP address spaces (domains) of the sub-networks, so that different sub-networks may use same IP addresses. A sub-network may comprise e.g. a control sub-network of an industrial plant, such as a factory, power plant (power station), food production plant, water treatment plant, gas plant, landfill, mine, and/or any other functional unit, such as an office, airport, railway station.

An exemplary embodiment enables managing and/or using customer virtual private networks via a standardized interface. This enables distributed delivery of user rights, however, with a centralized network management. The user is provided with information on the unique private address (e.g. 172 . . . network) by means of which the end user is able to connect to the corresponding virtual private network.

The functionality of the network apparatus 130, 111, 112, 131, 132, 133, 134 has been described in more detail above in connection with the Figures. It should be appreciated that the network apparatus 130, 111, 112, 131, 132, 133, 134 may comprise other units used in or for distributed computing and/or data federation. However, they are irrelevant to the actual invention and, therefore, they need not to be discussed in more detail here.

The apparatus may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting in-formation to the network, connectable to the network wirelessly or via a fixed connection. Examples of the user terminal include a personal computer, a game console, a laptop (a notebook), a personal digital assistant, a mobile station (mobile phone), and a line telephone.

Figure 12:
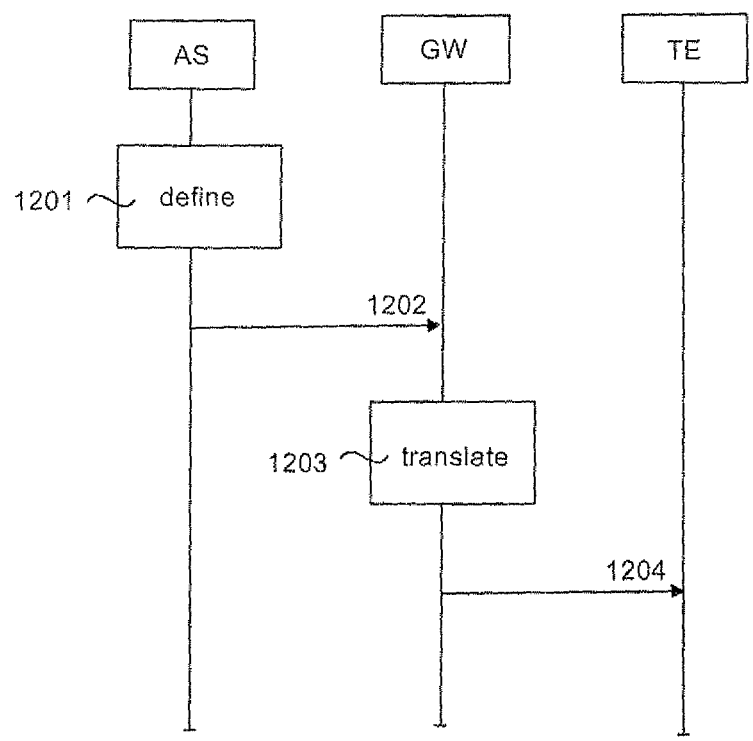
FIG. 12 shows a messaging diagram illustrating an exemplary messaging event.

The apparatus 130, 111, 112, 131, 132, 133, 134 may generally include a processor, controller, control unit or the like connected to a memory and to various interfaces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment, The signalling chart of FIG. 12 illustrates the required signalling. In the example of FIG. 12, a network element AS which may comprise e.g. application server, defines, in item 1201, a unique private IP address for a terminal TE located in a remote customer network, the unique private IP address uniquely identifying the terminal TE and the corresponding remote customer network. The network element AS also defines, in item 1201, an IP routing address for the remote customer network. The network element AS transmits a message 1202 to a gateway node GW which may comprise e.g. security gateway, such as a VPN gateway. The message 1202 includes information on the unique private IP address defined in the application server AS, based on which a data packet can be routed from the application server AS via the gateway node GW to a virtual private network tunnel having the IP routing address defined for the remote customer network. In response to receiving the message 1202 in the gateway node GW, the unique private IP address of the terminal is translated, in item 1203, into a corresponding customer IP address of the terminal TE in order the data packet to be routable, in a message 1204, to the terminal TE in the remote customer network.

The security gateway according to an exemplary embodiment enables establishing VPN connections to multiple VPNs utilizing different VPN technologies, in a convenient way.

The web server (i.e. application server) according to an exemplary embodiment may provide a user interface that enables a VPN connection to be opened by the user. A user profile may be created/maintained, the profile comprising information on actions that are allowed to the user.

An exemplary embodiment enables managing a situation where remote devices have overlapping IP addresses.

In an exemplary embodiment, the connecting, disconnecting and/or querying the status of the remote network connection may be initialized by an action of the user, and/or, in a timed manner, by an action of the application server logic.

The steps/points, signaling messages and related functions described above in FIGS. 1 to 12 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point. The apparatus operations illustrate a procedure that may be implemented in one or more physical or logical entities. The signaling messages are only exemplary and may even comprise several separate messages for transmitting the same information. In addition, the messages may also contain other information.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firm-ware or software, implementation may be through modules (e.g. procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it may be communicatively coupled to the processor/computer via various means as is known in the art.

Thus, according to an exemplary embodiment, there is provided a method for managing data routing information in a communications system, the method comprising defining, in a client network apparatus, a unique private IP address for a terminal located in a remote customer network, the unique private IP address uniquely identifying the terminal and the corresponding remote customer network; defining, in the client network apparatus, an IP routing address for the remote customer network; routing a data packet from the client network apparatus to a virtual private network tunnel having the IP routing address defined for the remote customer network, the data packet being directed to the remote customer network, the remote customer network being identified by the unique private IP address, wherein the unique private IP address of the terminal is translated into a corresponding customer IP address of the terminal in order the data packet to be routable to the terminal in the remote customer network.

According to another exemplary embodiment, there is provided a method for defining, in the client network apparatus, the unique private IP address for the terminal in response the terminal being installed to the remote customer network.

According to yet another exemplary embodiment; there is provided a method for routing the data packets from the client network apparatus to the virtual private network tunnel via a security gateway apparatus.

According to yet another exemplary embodiment, the unique private IP address of the terminal is translated into a corresponding customer IP address of the terminal based on information stored in the client network apparatus.

According to yet another exemplary embodiment, there is provided a method for maintaining in the client network apparatus an asset model, the asset model comprising information on the unique private IP address of the terminal, information on a security gateway apparatus to be used for the remote customer network, and a template for managing the security gateway apparatus based on a virtual private network technology.

According to yet another exemplary embodiment, there is provided a method for providing a web service client in the client network apparatus for connecting to a security web service of a security gateway apparatus, According to yet another exemplary embodiment, there is provided a method for providing a security gateway web service interface in a security gateway apparatus, the security gateway web service interface comprising a connect function for creating a connection to a remote customer network, a disconnect function for disconnecting a remote customer network connection, and a query status function for querying the status of the connection to the remote customer network, wherein parameters of said connect, disconnect and query status functions are provided by means of connect, disconnect and query status security templates correspondingly.

According to yet another exemplary embodiment, there is provided a method for providing a client network apparatus user interface providing a view for a user to configure security templates and security template parameters, wherein a security template involves a template type and template data, the template type being "Execute", "Execute: Loop for each terminal", or "Create file", "Execute" type running a command defined in a command parameter, "Execute: Loop for each terminal" type executing the command, the command parameter being cloned for each terminal using the template, and "Create file" type taking FileName and FileContent as a parameter.

According to yet another exemplary embodiment, a security template includes parameters which are replaced with concrete values of a remote customer network configuration.

According to yet another exemplary embodiment, there is provided an apparatus comprising a communication control circuitry configured to define a unique private IP address for a terminal located in a remote customer network, the unique private IP address uniquely identifying the terminal and the corresponding remote customer network; define an IP routing address for the remote customer network; route a data packet from the apparatus to a virtual private network tunnel having the IP routing address defined for the remote customer network, the data packet being directed to the remote customer network, the remote customer network being identified by the unique private IP address, wherein the unique private IP address of the terminal is translated into a corresponding customer IP address of the terminal in order the data packet to be routable to the terminal in the remote customer network.

According to yet another exemplary embodiment, there is provided an apparatus comprising at least one processor; and at least one memory including a computer program code, wherein the at least one memory and the computer program code are configured to, with the at least one processor, cause the apparatus to define a unique private IP address for a terminal located in a remote customer network, the unique private IP address uniquely identifying the terminal and the corresponding remote customer network; define an IP routing address for the remote customer network; route a data packet from the apparatus to a virtual private network tunnel having the IP routing address defined for the remote customer network, the data packet being directed to the remote customer network, the remote customer network being identified by the unique private IP address, wherein the unique private IP address of the terminal is translated into a corresponding customer IP address of the terminal in order the data packet to be routable to the terminal in the remote customer network.

According to yet another exemplary embodiment, the at least one memory and the computer program code are further configured to, with the at least one processor, cause the apparatus to define the unique private IP address for the terminal in response the terminal being installed to the remote customer network.

According to yet another exemplary embodiment, the at least one memory and the computer program code are further configured to, with the at least one processor, cause the apparatus to route the data packets from the apparatus to the virtual private network tunnel via a security gateway apparatus.

According to yet another exemplary embodiment, the at least one memory and the computer program code are further configured to, with the at least one processor, cause the apparatus to maintain an asset model, the asset model comprising information on the unique private IP address of the terminal, information on a security gateway apparatus to be used for the remote customer network, and a template for managing the security gateway apparatus based on a virtual private network technology.

According to yet another exemplary embodiment, the at least one memory and the computer program code are further configured to, with the at least one processor, cause the apparatus to provide a web service client for connecting to a security web service of a security gateway apparatus.

According to yet another exemplary embodiment, the at least one memory and the computer program code are further configured to, with the at least one processor, cause the apparatus to provide a user interface providing a view for a user to configure security templates and security template parameters, wherein a security template involves a template type and template data, the template type being "Execute", "Execute: Loop for each terminal", or "Create file", "Execute" type running a command defined in a command parameter, "Execute: Loop for each terminal" type executing the command, the command parameter being cloned for each terminal using the template, and "Create file" type taking FileName and FileContent as a parameter.

According to yet another exemplary embodiment, a gateway node comprising a communication control circuitry configured to route a data packet from a client network apparatus to a virtual private network tunnel, the virtual private network tunnel based on an IP routing address defined for a remote customer network, the data packet being directed to the remote customer network, the remote customer network being identified by a unique private IP address, the unique private IP address uniquely identifying a terminal and the corresponding remote customer network; and translate the unique private IP address of the terminal into a corresponding customer IP address of the terminal in order the data packet to be routable to the terminal in the remote customer network.

According to yet another exemplary embodiment, the communication control circuitry is further configured to route the data packets from the client network apparatus to the virtual private network tunnel.

According to yet another exemplary embodiment, the communication control circuitry is further configured to provide a web service interface, the web service interface comprising a connect function for creating a connection to a remote customer network, a disconnect function for disconnecting a remote customer network connection, and a query status function for querying the status of the connection to the remote customer network, wherein parameters of said connect, disconnect and query status functions are provided by means of connect, disconnect and query status security templates correspondingly.

According to yet another exemplary embodiment, a computer program comprises program code means adapted to perform any one of the following steps when the program is run on a computer: defining, in a client network apparatus, a unique private IP address for a terminal located in a remote customer network, the unique private IP address uniquely identifying the terminal and the corresponding remote customer network; defining, in the client network apparatus, an IP routing address for the remote customer network; routing a data packet from the client network apparatus to a virtual private network tunnel having the IP routing address defined for the remote customer network, the data packet being directed to the remote customer network, the remote customer network being identified by the unique private IP address, wherein the unique private IP address of the terminal is translated into a corresponding customer IP address of the terminal in order the data packet to be routable to the terminal in the remote customer network.

According to yet another exemplary embodiment, an article of manufacture comprises a computer readable medium and embodying program instructions thereon executable by a computer operably coupled to a memory which, when executed by the computer, carry out the functions of defining, in a client network apparatus, a unique private IP address for a terminal located in a remote customer network, the unique private IP address uniquely identifying the terminal and the corresponding remote customer network; defining, in the client network apparatus, an IP routing address for the remote customer network; routing a data packet from the client network apparatus to a virtual private network tunnel having the IP routing address defined for the remote customer network, the data packet being directed to the remote customer network, the remote customer network being identified by the unique private IP address, wherein the unique private IP address of the terminal is translated into a corresponding customer IP address of the terminal in order the data packet to be routable to the terminal in the remote customer network.

It will be obvious to a person skilled in the art that, as the technology advances, the inventive concept can be implemented in various ways. The invention and its embodiments are not limited to the examples described above but may vary within the scope of the claims.

The invention claimed is:

1. A method for managing data routing information in a communications system, the method comprising:
 defining, in a client network apparatus, a unique private IP address for a terminal located in a remote customer network, the unique private IP address uniquely identifying the terminal and the corresponding remote customer network;
 defining, in the client network apparatus, an IP routing address for the remote customer network;
 routing a data packet from the client network apparatus to a virtual private network tunnel having the IP routing address defined for the remote customer network, the data packet being directed to the remote customer network, the remote customer network being identified by the unique private IP address, and
 providing a client network apparatus user interface providing a view for a user to configure security templates and security template parameters, wherein a security template involves a template me and template data, the template type being an execute template type, an execute loop for each terminal template type, or a create file template type, the execute template type running a command defined in a command parameter, the execute loop for each terminal template type executing the command, the command parameter being cloned for each terminal using the template, and the create file template type taking file name and file content as a parameter, wherein the unique private IP address of the terminal is translated into a corresponding customer IP address of the terminal in order the data packet to be routable to the terminal in the remote customer network.

2. A method as claimed in claim 1, wherein the method comprises defining, in the client network apparatus, the unique private IP address for the terminal in response the terminal being installed to the remote customer network.

3. A method as claimed in claim 1, wherein the method comprises routing the data packets from the client network apparatus to the virtual private network tunnel via a security gateway apparatus.

4. A method as claimed in claim 1, wherein the unique private IP address of the terminal is translated into a corresponding customer IP address of the terminal based on information stored in the client network apparatus.

5. A method as claimed in claim 1, wherein the method comprises maintaining in the client network apparatus an asset model, the asset model comprising information on the unique private IP address of the terminal, information on a security gateway apparatus to be used for the remote customer network, and a template for managing the security gateway apparatus based on a virtual private network technology.

6. A method as claimed in claim 1, wherein the method comprises providing a web service client in the client network apparatus for connecting to a security web service of a security gateway apparatus.

7. A method as claimed in claim 1, wherein the method comprises providing a security gateway web service interface in a security gateway apparatus, the security gateway web service interface comprising a connect function for creating a connection to a remote customer network, a disconnect function for disconnecting a remote customer network connection, and a query status function for querying the status of the connection to the remote customer network, wherein parameters of said connect, disconnect and query status functions are provided by means of connect, disconnect and query status security templates correspondingly.

8. A method as claimed in claim 1, wherein a security template includes parameters which are replaced with concrete values of a remote customer network configuration.

9. An apparatus comprising a communication control circuitry configured to:
define a unique private IP address for a terminal located in a remote customer network, the unique private IP address uniquely identifying the terminal and the corresponding remote customer network;
define an IP routing address for the remote customer network;
route a data packet from the apparatus to a virtual private network tunnel having the IP routing address defined for the remote customer network, the data packet being directed to the remote customer network, the remote customer network being identified by the unique private IP address, wherein the unique private IP address of the terminal is translated into a corresponding customer IP address of the terminal in order the data packet to be routable to the terminal in the remote customer network; and
provide a user interface providing a view for a user to configure security templates and security template parameters, wherein a security template involves a template type and template data, the template type being an execute template type, an execute loop for each terminal template type, or a create file template type, the execute template type running a command defined in a command parameter, the execute loop for each terminal template type executing the command, the command parameter being cloned for each terminal using the template and the create file template type taking file name and file content as a parameter.

10. An apparatus comprising
at least one processor; and
at least one memory including a computer program code, wherein the at least one memory and the computer program code are configured to, with the at least one processor, cause the apparatus to:
define a unique private IP address for a terminal located in a remote customer network, the unique private IP address uniquely identifying the terminal and the corresponding remote customer network;
define an IP routing address for the remote customer network;
route a data packet from the apparatus to a virtual private network tunnel having the IP routing address defined for the remote customer network, the data packet being directed to the remote customer network, the remote customer network being identified by the unique private IP address, wherein the unique private IP address of the terminal is translated into a corresponding customer IP address of the terminal in order the data packet to be routable to the terminal in the remote customer network; and
provide a user interface providing a view for a user to configure security templates and security template parameters, wherein a security template involves a template type and template data, the template type being an execute template type, an execute loop for each terminal template type, or a create file template type, the execute template type running a command defined in a command parameter, the execute loop for each terminal template type executing the command, the command parameter being cloned for each terminal using the template, and the create file template type taking file name and file content as a parameter.

11. An apparatus as claimed in claim 10, wherein the at least one memory and the computer program code are further configured to, with the at least one processor, cause the apparatus to define the unique private IP address for the terminal in response the terminal being installed to the remote customer network.

12. An apparatus as claimed in claim 10, wherein the at least one memory and the computer program code are further configured to, with the at least one processor, cause the apparatus to route the data packets from the apparatus to the virtual private network tunnel via a security gateway apparatus.

13. An apparatus as claimed in claim 10, wherein the at least one memory and the computer program code are further configured to, with the at least one processor, cause the apparatus to maintain an asset model, the asset model comprising information on the unique private IP address of the terminal, information on a security gateway apparatus to be used for the remote customer network, and a template for managing the security gateway apparatus based on a virtual private network technology.

14. An apparatus as claimed in claim 10, wherein the at least one memory and the computer program code are further configured to, with the at least one processor, cause the apparatus to provide a web service client for connecting to a security web service of a security gateway apparatus.

15. A gateway node comprising a communication control circuitry configured to:
   route a data packet from a client network apparatus to a virtual private network tunnel, the virtual private network tunnel based on an IP routing address defined for a remote customer network, the data packet being directed to the remote customer network, the remote customer network being identified by a unique private IP address, the unique private IP address uniquely identifying a terminal and the corresponding remote customer network; and
   translate the unique private IP address of the terminal into a corresponding customer IP address of the terminal in order the data packet to be routable to the terminal in the remote customer network,
   wherein a client network apparatus user interface provides a view for a user to configure security templates and security template parameters, wherein a security template involves a template type and template data, the template type being an execute template type, an execute loop for each terminal template type, or a create file template type, the execute template type running a command defined in a command parameter, the execute loop for each terminal template type executing the command, the command parameter being cloned for each terminal using the template, and the create file template type taking file name and file content as a parameter.

16. A gateway node as claimed in claim 15, wherein the communication control circuitry is further configured to route the data packets from the client network apparatus to the virtual private network tunnel.

17. A gateway node as claimed in claim 15, wherein the communication control circuitry is further configured to provide a web service interface, the web service interface comprising a connect function for creating a connection to a remote customer network, a disconnect function for disconnecting a remote customer network connection, and a query status function for querying the status of the connection to the remote customer network, wherein parameters of said connect, disconnect and query status functions are provided by means of connect, disconnect and query status security templates correspondingly.

18. A gateway node as claimed in claim 15, wherein a security template includes parameters which are replaced with concrete values of a remote customer network configuration.

19. A non-transitory computer readable medium and embodying program instructions thereon executable by a computer operably coupled to a memory which, when executed by the computer, carry out the functions of:
   defining, in a client network apparatus, a unique private IP address for a terminal located in a remote customer network, the unique private IP address uniquely identifying the terminal and the corresponding remote customer network;
   defining, in the client network apparatus, an IP routing address for the remote customer network;
   routing a data packet from the client network apparatus to a virtual private network tunnel having the IP routing address defined for the remote customer network, the data packet being directed to the remote customer network, the remote customer network being identified by the unique private IP address, wherein the unique private IP address of the terminal is translated into a corresponding customer IP address of the terminal in order the data packet to be routable to the terminal in the remote customer network; and
   providing a client network apparatus user interface providing a view for a user to configure security templates and security template parameters, wherein a security template involves a template type and template data, the template type being an execute template type, an execute loop for each terminal template type, or a create file template type, the execute template type running a command defined in a command parameter, the execute loop for each terminal template type executing the command, the command parameter being cloned for each terminal using the template, and the create file template type taking file name and file content as a parameter.

* * * * *